Aug. 10, 1965     A. P. NAKOLAN     3,199,918
RETRACTABLE SEAT BELT
Filed Nov. 19, 1963     2 Sheets-Sheet 1

INVENTOR.
Andrew P. Nakolan
BY
Hugh L. Fisher
ATTORNEY

Aug. 10, 1965   A. P. NAKOLAN   3,199,918
RETRACTABLE SEAT BELT
Filed Nov. 19, 1963   2 Sheets-Sheet 2

INVENTOR.
Andrew P. Nakolan
BY
Hugh L. Fisher
ATTORNEY

United States Patent Office 3,199,918
Patented Aug. 10, 1965

3,199,918
RETRACTABLE SEAT BELT
Andrew P. Nakolan, New Baltimore, Mich., assignor to General Motors Corporation, Detroit, Mich., a corporation of Delaware
Filed Nov. 19, 1963, Ser. No. 324,733
2 Claims. (Cl. 297—388)

This invention relates in general to seat belt assemblies for motor vehicles and more particularly to apparatus for automatically retracting the seat belt when not in use.

Recently, seat belts have gained wide acceptance with the motoring public as an important means of preventing or at least minimizing injuries to vehicle passengers during a collision or sudden stopping of the vehicle. Such seat belts are usually formed of two straps of webbing each secured at one end to the floor or frame of the vehicle and having cooperating buckle parts fastened to the other end to secure the passenger in his seat.

One of the drawbacks associated with such seat belt assemblies is that when the belt is not in use, the free ends are usually found disarranged on the seat or on the floor where they may become soiled or caught in the vehicle door. To remedy this condition, it has been suggested that apparatus be provided for automatically retracting the seat belts when not in use. Generally, such apparatus includes a spring assembly and a latching mechanism. The spring assembly is operatively connected to the seat belt and normally exerts a force on the seat belt in a retracting direction. The latching mechanism is adapted to relieve the tension of the spring assembly when the seat belt is extended to its operative position where the tension might have an irritating effect on the user of the seat belt. One such seat belt retracting device is shown in the patent to McCall 2,964,100. However, in the McCall patent the occupant must manually disengage the latching mechanism in order to render the spring assembly effective to retract the seat belt when it is no longer needed. This creates an inconvenience to the user of the seat belt.

The drawbacks associated with the prior art retractable seat belts are obviated by the present invention in which seat belt retracting apparatus is provided which includes a spring assembly and an occupancy responsive latching mechanism for automatically relieving the normal spring tension of the spring assembly when the seat is occupied and the belt is extended while permitting automatic retraction of the seat belt when the seat is no longer occupied.

A more complete understanding of the present invention may be had from the following detailed description which should be read in conjunction with the drawings in which.

Figure 1:
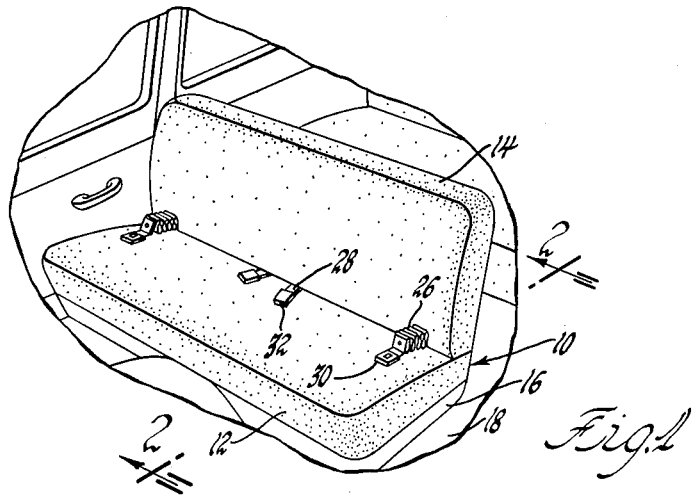
FIGURE 1 is a perspective view of a motor vehicle seat incorporating the seat belt apparatus of the present invention.
Figure 2:
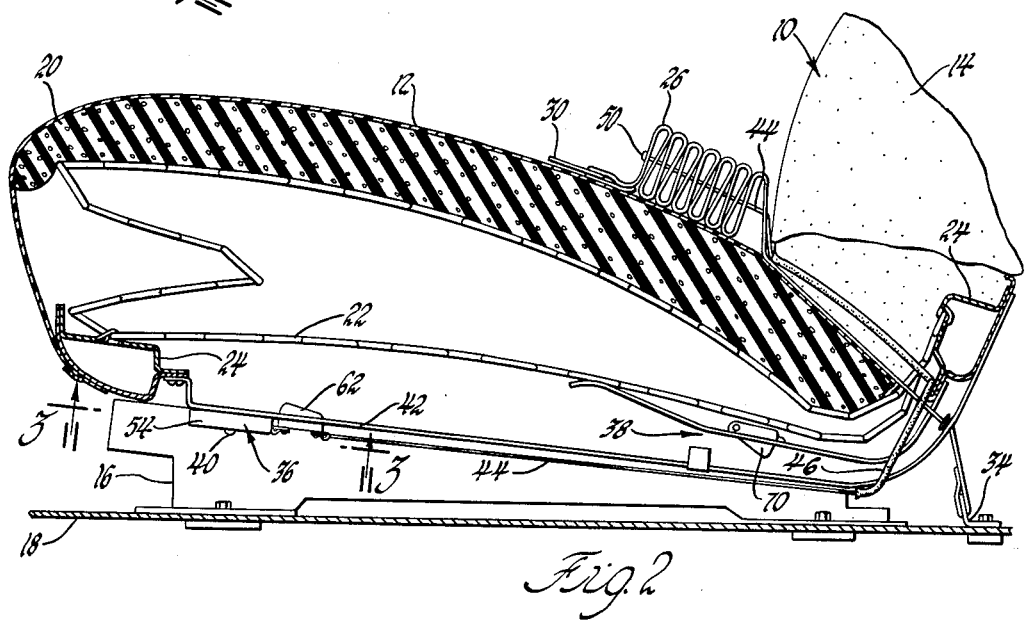
FIGURE 2 is a sectional view taken along lines 2—2 of FIGURE 1 and showing the seat belt in a retracted position.
Figure 3:
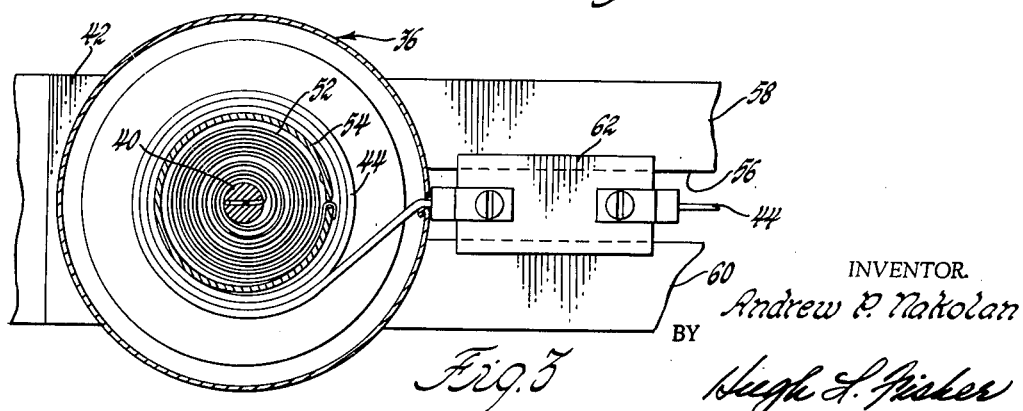
FIGURE 3 is a sectional view taken along lines 3—3 of FIGURE 2.

Referring now to the drawings and initially to FIGURES 1 through 3, a motor vehicle seat generally indicated by the reference numeral 10 having a seat cushion 12 and a seat back 14 is shown mounted in a seat support 16 suitably secured to the vehicle floor 18. The seat cushion 12 comprises a layer of foam rubber or other resilient material 20 which is supported in the conventional manner by the seat springs 22 on the seat frame 24. The seat belt assemblies for both the driver and passenger sides of the seat 10 include a pair of seat belt straps 26 and 28. In accordance with the general practice, each of the seat belt straps comprises a flexible length of webbing or other similar material. Cooperating buckle members 30 and 32 are attached to the free ends of the seat belt straps 26 and 28 respectively. Each of the belt straps 26 and 28 is secured to a mounting bracket 34 suitably attached to the vehicle floor 18 adjacent the rear edge of the seat 10.

The seat belt retracting apparatus of the present invention will be described in connection with the outboard seat belt strap 26 on the driver side of the seat 10, it being understood that similar apparatus is provided for the outboard strap 26 on the passenger side of the seat 10 and may optionally be provided for the seat belt straps 28.

Figure 7:
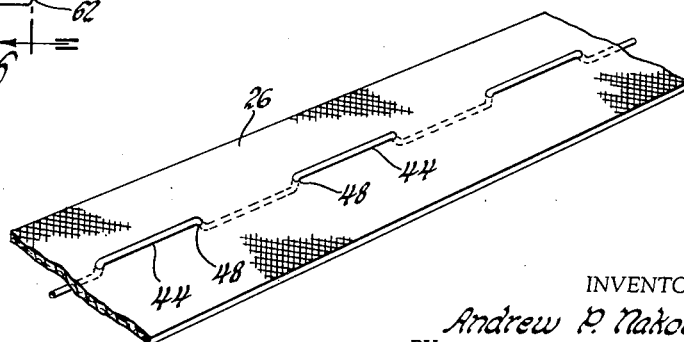
FIGURE 7 is a perspective view of a portion of the outboard seat belt strap.

The retracting apparatus includes a spring assembly generally designated 36 and an occupancy responsive latching mechanism generally designated 38. The spring assembly 36 is secured by means of a stud or shaft 40 to a guide member 42 which is suitably attached to the seat frame 24. The spring assembly 36 is operatively connected to the seat belt strap 26 by means of a flexible cable or cord 44. The cable 44 extends through a flexible tube 46 and is threaded through aligned openings 48 in a portion of the seat belt strap 26 as clearly shown in FIGURE 7. The spring assembly 36 normally exerts a pulling force on the cable 44 which is provided with an enlarged portion or button 50 on the free end thereof to cause the belt strap 20 to be drawn up in accordionlike fashion against the seat back 14.

The spring assembly 36 comprises a spiral spring 52 having one end attached to the stud 40 with the other end secured to a cylindrical storage drum 54. One end of the cable 38 is attached to the drum 54 and the spring 52 normally tends to rotate the drum 54 in a clockwise direction to wind the cable 44 thereon. The guide member 42 is provided with a longitudinal slot 56 to form opposed tracks 58 and 60. The cable 44 is severed intermediate its ends, the severed ends being attached to a stop member 62 which is supported in the tracks 58 and 60 for travel in the slot 56 in response to extension and retraction of the belt strap 26. The stop member 62 is adapted to cooperate with the occupancy responsive latching mechanism 38 when the seat belt is extended to its operative position to relieve the spring tension of the spring assembly 36 as will become apparent hereinafter.

Figure 4:
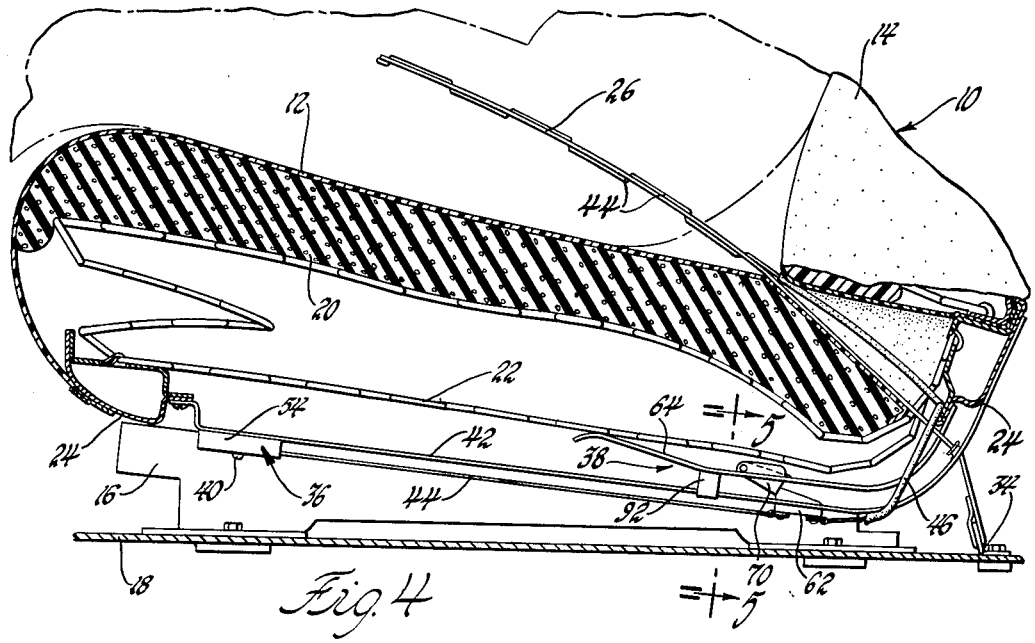
FIGURE 4 is a sectional view similar to FIGURE 2 but showing the seat belt in its extended or operative position.
Figure 6:
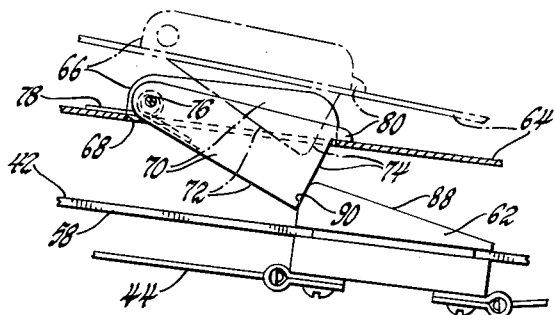
FIGURE 6 is a sectional view taken along lines 6—6 of FIGURE 5.
Figure 5:
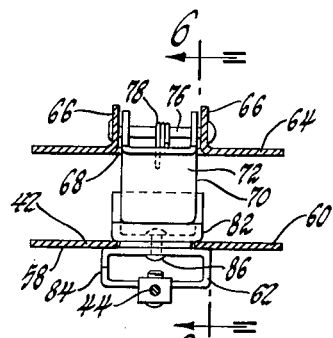
FIGURE 5 is a view taken along lines 5—5 of FIGURE 4.

Referring to FIGURES 4 through 6, the occupancy responsive latching mechanism 38 includes a cantilever spring 64 suitably attached at one end to the seat frame 24 with the other end in abutting engagement with the seat springs 22. The cantilever spring 64 will therefore respond to movement of the seat springs 22 in an upward or downward direction. The cantilever spring 64 is provided with upstanding flanges 66 and an aperture 68. A pawl 70 having inclined surfaces 72 and 74 is pivotally mounted on a pivot pin 76 extending between the flanges 66. A spring 78 normally biases the pawl 70 in a clockwise direction to the position shown in FIGURE 6 where a projecting tongue 80 engages the cantilever spring 64 to prevent further clockwise movement. The stop member 62 comprises upper and lower portions 82 and 84 coupled together by a rivet 86. The upper portion 82 is provided with inclined surfaces 88 and 90 adapted to cooperate with the inclined surfaces 72 and 74 of the pawl 70 when the seat belt is extended to its operative position as shown in FIGURE 6. A cantilever spring stop member 92 is mounted on the guide member 42 to insure constant deflection of the cantilever spring 64.

The operation of the retractable seat belt is as follows. It will be apparent from FIGURE 2 that when the seat 12 is not occupied, the stop member 62 is free to travel in a fore and aft direction since the cantilever spring 64 maintains the pawl 70 out of the path of movement of the stop member 62. The position of the pawl 70 with respect to the stop member 62 when the seat is not occupied is shown by the dotted lines in FIGURE 6. However, when the seat 10 is occupied by a passenger, the seat springs 22 deflect cantilever spring 64 to the position shown in FIGURE 4. If the seat belt strap 26 is now extended to its operative position, the stop member 62 will travel rearwardly and the inclined surface 88 of the stop member 62 will engage the inclined surface 72 of the pawl 70 to pivot the pawl in a counterclockwise direction against the bias of the spring 78. After the stop member 62 has passed the pawl 70, the spring 78 will return the pawl to its normal position where the inclined surface 90 is engaged by the inclined surface 74. The spring tension of the spring assembly 36 is now effectively removed from the seat belt strap 26 thus eliminating any irritating effect which it might have on the occupant of the seat. When the occupant rises from the seat 10, the seat springs 22 and the latching mechanism 38 will return to the position shown in FIGURE 2 thus releasing the stop member 62. The spring assembly 36 is then effective to retract the seat belt strap 26 in accordion-like fashion against the seat back 14.

From the above description, it is evident that a seat belt retractor is provided which will offer a minimum of inconvenience to the occupant of the vehicle thus encouraging the use of the seat belt.

Although the description of this invention has been given with respect to a particular embodiment, it is not to be construed in a limiting sense. Many variations and modifications within the spirit and scope of the invention will now occur to those skilled in the art. For a definition of the invention, reference is made to the appended claims.

I claim:
1. In combination with a seat adapted to be mounted in a motor vehicle, said seat having a seat cushion and a seat frame and spring means supporting said cushion on said frame, a retractable seat belt assembly comprising a seat belt secured at one end to said vehicle in spaced relationship with said seat, retracting means normally, yieldingly exerting a force on said belt in a retracting direction, said retracting means including a spring assembly, guide means attached to said frame and supporting said spring assembly, a flexible cable having one end connected to said spring assembly and the other end connected to the other end of said belt, stop means connected between the ends of said flexible cable and mounted in said guide means for travel therein in response to extension and retraction of said belt, a cantilever spring supported by said seat frame and in abutting relationship with said spring means, a pawl pivotally mounted on said cantilever spring, said cantilever spring adapted to be deflected when said seat is occupied to place said pawl in the path of movement of said stop means, said pawl adapted to allow travel of said stop means in response to extension of said belt to an operative position and to thereafter prevent travel of said stop means in a belt retracting direction whereby said force is automatically removed during use of said belt, said cantilever spring returning to a non-deflected position when said seat is no longer occupied to allow automatic retraction of said belt.

2. The combination recited in claim 1 including additional stop means mounted on said guide means in the path of travel of said cantilever spring to prevent deflection of said pawl beyond a predetermined position.

References Cited by the Examiner

UNITED STATES PATENTS 3,128,124  4/64  Fredericks _____ 297—388

FRANK B. SHERRY, *Primary Examiner.*